United States Patent [19]

Baron et al.

[11] Patent Number: 4,475,202
[45] Date of Patent: Oct. 2, 1984

[54] GAS LASER

[75] Inventors: Klaus U. Baron, Heidelberg; Hans-Bertram Wiegemann, Schriesheim, both of Fed. Rep. of Germany

[73] Assignee: Teldix GmbH, Heidelberg, Fed. Rep. of Germany

[21] Appl. No.: 344,955

[22] Filed: Feb. 2, 1982

[30] Foreign Application Priority Data

Feb. 2, 1981 [DE] Fed. Rep. of Germany ....... 3103385

[51] Int. Cl.$^3$ .............................................. H01S 3/03
[52] U.S. Cl. ....................................... 372/61; 372/87; 372/64; 372/55
[58] Field of Search ........................ 372/61, 64, 87, 55

[56] References Cited

U.S. PATENT DOCUMENTS 3,927,946 12/1975 McClure ..................... 356/106 LR
3,936,767 2/1976 Besson et al. .......................... 372/88
4,195,908 4/1980 Kestigian et al. .................... 350/151

FOREIGN PATENT DOCUMENTS 2343140 3/1974 Fed. Rep. of Germany .
2603267 8/1976 Fed. Rep. of Germany .
3003669 8/1980 Fed. Rep. of Germany .

Primary Examiner—William L. Sikes
Assistant Examiner—Léon Scott, Jr.
Attorney, Agent, or Firm—Spencer & Frank

[57] ABSTRACT

In a gas laser composed of a capillary tube made of electrically nonconductive material and presenting a capillary passage, a reservoir tank whose interior is in communication with the passage, the tank including a cylindrical portion coaxially surrounding the capillary tube and axial end portions via which the tube is connected to the tank in a manner to seal the interior of the tank, a mass of active laser gas filling the interior of the reservoir tank and the capillary passage, a cathode disposed in the interior of the tank, a counterelectrode in communication with the capillary passage, and optical elements sealing the ends of the capillary passage, the capillary tube is symmetrical with respect to a plane perpendicular to the axis of the capillary passage and midway between the ends thereof, the counterelectrode is composed of two anodes each disposed at a respective axial end of the capillary tube, communication between the capillary passage ang the interior of the tank is provided by an opening passing through the capillary tube, and a radially stiff, axially mobile mechanical connection is provided between at least one portion of the capillary tube at at least one portion of the tank.

7 Claims, 3 Drawing Figures

GAS LASER

BACKGROUND OF THE INVENTION

The present invention relates to a gas laser.

One known type of gas laser is composed of a capillary tube presenting a capillary passage and made of a nonconductive material, such as glass, ceramics or the like; a reservoir tank in communication with the capillary passage and coaxially enclosing the capillary tube, and having an envelope which is fastened in two axially offset planes to the capillary tube so as to seal the reservoir tank, the tank and tube being filled with an active laser gas; a cathode accommodated in the tank; a counterelectrode in communication with the capillary passage; and mirrors terminating the capillary passage, at least one of the mirrors being partially transparent, or transparent plates oriented at the Brewster angle and cooperating with external mirrors.

A gas laser having the above features is shown in FIG.1 of German Offenlegungsschrift [Laid-open Application] No. 2,343,140. The laser tube illustrated and described there includes a capillary tube of glass provided at one of its ends with an anode which is in communication with the capillary passage provided by the capillary tube. At its other end, the capillary tube has a connection to the reservoir tank which coaxially encloses the capillary tube. The reservoir tank is formed in part by an envelope which is likewise made of glass and contains the cathode of the laser. Both ends of the glass envelope of the reservoir tank are connected to the glass capillary tube.

In such a laser tube, in which both ends of the capillary tube are connected with the envelope of the reservoir tank, there exists the danger, because of the differential heating, and thus differential expansion, of the various parts during laser operation, that the envelope of the reservoir tank will rupture. Moreover, because of the fused connection of the glass envelope to the glass capillary tube at two locations, which is required if the laser is to remain tight for a long period of time even under environmental stresses such as chemical influences, temperature fluctuations and possibly shocks and/or vibrations, this solution suffers from an influence, e.g. widening of the inner diameter of the capillary tube, at two points which has a negative influence on the laser gain. For these reasons, the capillary tubes of lasers are generally fastened only at one side to the envelope of the reservoir tank, as disclosed, for example, in German Offenlegungsschriften Nos. 2,603,267 and 3,003,669. However, this again leads to basic alignment difficulties, particularly in view of the above-mentioned environmental influences.

SUMMARY OF THE INVENTION

It is an object of the present invention to provide a laser tube which has the shortest possible structural length with high output and, on the other hand, experiences minimal changes in its characteristics under environmental influences and cannot be destroyed by extreme temperature variations.

The above and other objects are achieved, according to the present invention, in a gas laser composed of a capillary tube made of electrically nonconductive material and presenting a capillary passage, a reservoir tank whose interior is in communication with the passage, the tank including a cylindrical portion coaxially surrounding the capillary tube and axial end portions via which the tube is connected to the tank in a manner to seal the interior of the tank, a mass of active laser gas filling the interior of the reservoir tank and the capillary passage, a cathode disposed in the interior of the tank, a counterelectrode in communication with the capillary passage, and optical means sealing the ends of the capillary passage, by constructing the capillary tube to be symmetrical with respect to a plane perpendicular to the axis of the capillary passage and midway between the ends thereof, constituting the counterelectrode of two anodes each disposed at a respective axial end of the capillary tube, establishing communication between the capillary passage and the interior of the tank by an opening passing through the capillary tube and located in the plane midway between the ends of said capillary passage, and further providing the laser with means associated with the tank for providing a radially stiff, axially mobile mechanical association between at least one portion of the capillary tube at at least one portion of the tank.

The laser according to the invention combines high output with small structural length, resulting from the use of two anodes which are arranged directly at the two ends and are preferably integrated in the frontal faces of the capillary tube. The attachment of both ends of the capillary tube to the reservoir tank assures freedom from tilting and displacements due to shock, vibrations and temperature fluctuations.

Destruction due to operationally required temperature influences, possibly supplemented by environmental, shock and vibration stresses, is prevented with the use of deformable, or flexible, parts in the connections between the two parts themselves or in the envelope. The coaxial arrangement of the reservoir tank additionally permits attainment of a small structural volume.

If, as already mentioned, the anodes are integrated with the frontal faces of the capillary tube in order to fully utilize the capillary tube, it is of advantage to fasten the laser mirrors and/or the transparent plates to be attached at the Brewster angle.

Preferably, the reservoir tank is made of metal or a similar material which can be easily worked mechanically. Such a selection has the advantage that the reservoir tank, once it has been connected to the capillary tube, can be worked further in the sense of producing coincidence of coaxiality of at least parts of the envelope surface with the capillary axis. Thus for operation, the laser need only be held at those faces which are coaxial with the capillary tube and complicated alignment of the laser for accurate orientation of the capillary axis with the axis of the higher priority optical system is eliminated.

The connection between the envelope of the reservoir tank and the capillary tube is preferably effected in such a manner that the two regions to which the envelope is to be fastened are metallized. Such metallization enables the metal part, be it the metallic envelope of the tank itself or a metallic intermediate piece, e.g. a metallic, deformable ring, to be soldered on without the capillary tube having to be adversely influenced thereby.

When a metallic ring is used, the metallic sleeve of the tank can be welded to this ring. If the sleeve is a body of glass, the edge of the ring can be fused into the glass body.

Most advantageously, the reservoir tank includes a metal cylinder and two frontal rings connected thereto, with one of the rings being connected to the cathode, which can have the form of a cylinder. The inner edges of these frontal rings are then welded to the deformable parts which, in turn, are soldered to the capillary tube.

These parts, which produce a slight axial mobility, may also be disposed, for example, at the points of connection between the frontal rings and the cylinder or in the cylinder surface itself, or in the form of a U-shaped convex or concave bulge.

The laser according to the invention, in its form having transparent terminating plates attached at the Brewster angle, is preferably suitable as an optical source for the two oppositely rotating light beams of an active laser gyro, with the required feedback connections for both beams being effected in the known manner via the deflection mirrors of the laser gyro. A laser gyro of this type is illustrated for example in FIG. 1 of U.S. Pat. No. 3,927,946 or U.S. Pat. No. 4,195,908.

Embodiments of the invention will now be described in greater detail with reference to embodiments that are illustrated in the drawing.

DESCRIPTION OF THE PREFERRED EMBODIMENTS

Figure 1:
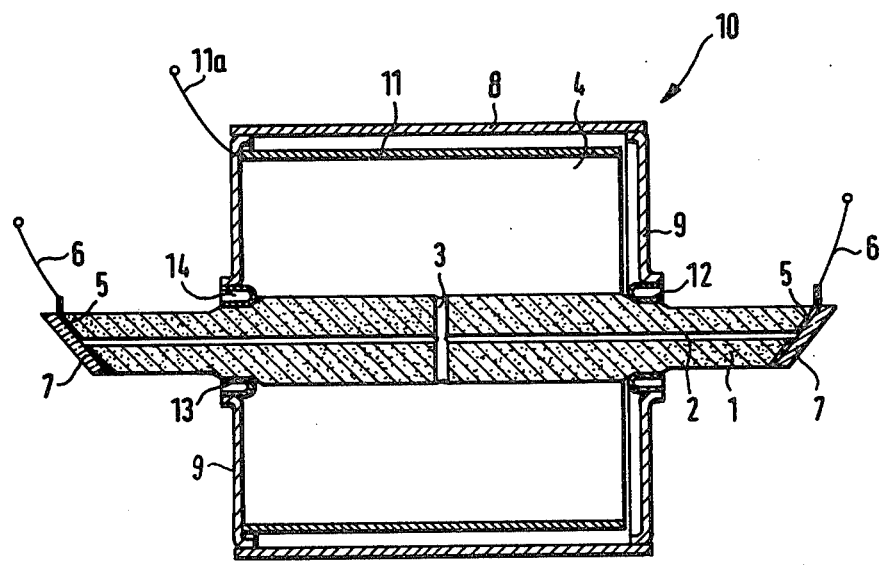
FIG. 1 is a cross-sectional view of a first preferred embodiment of the invention.

The embodiment shown in FIG. 1 includes a capillary tube 1 made of ceramic material and presenting a capillary passage 2. Midway between its ends, the capillary tube is additionally provided with a transverse bore 3 which places the capillary passage 2 in communication with a reservoir tank 4 arranged coaxially with tube 1. The capillary passage 2 and the reservoir tank 4 are filled with a suitable gas, in particular a noble gas or mixtures thereof.

At the end of the capillary passage 2, metal plates 5 which are adjacent to the capillary passage are fastened on the capillary tube 1 with an oblique orientation to the axis of passage 2 and are each penetrated by a bore centered on the capillary passage axis. Plates 5 are the anodes of the laser and are connected to a suitable current supply via terminals 6.

Transparent glass plates 7 are fastened to the metal plates under the so-called Brewster angle. They seal the capillary passage in a vacuum-tight manner and, because of their arrangement under the stated angle, permit the laser radiation to penetrate without reflection. In this case, external mirrors (not shown) are required to reflect part of the laser beam back into the capillary passage 2.

The envelope of the reservoir tank 4 is composed of a metal cylinder 8 and two axially spaced metal frontal rings 9 whose outer peripheries are connected, preferably by welding, to respective axial ends of cylinder 8, at the corners 10 of the resulting tank. A cathode 11 in the form of a cylinder is fastened to one of the frontal rings 9 and is connected with the current supply via a terminal 11a.

In order to sealingly connect the ceramic capillary tube 1 with the envelope 8, 9 of the coaxial reservoir 4, cylindrical regions 12 and 13 of the outer surface of the capillary tube 1 are metallized, i.e. metal plated. Moreover, at their inner peripheries, the frontal rings 9 are connected, particularly by welding, to annular metallic spring rings 14 of U-shaped cross section which provide for slight axial mobility with good radial stiffness. These spring rings are soldered to the outer surface of the capillary tube 1 at the metallized surfaces 12 and 13. With this manner of making connections, the capillary tube will not be overheated and thus there will be no influence on the capillary tube.

Figure 2:
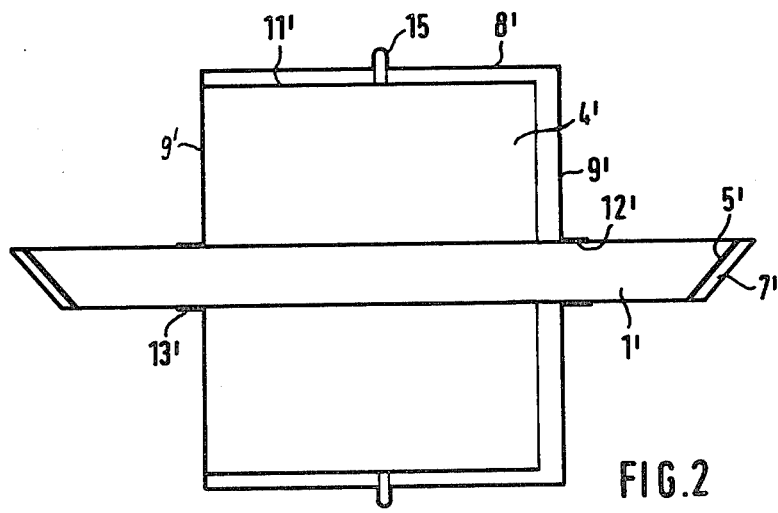
FIG. 2 is a simplified view, in the same direction as FIG. 1, of a second embodiment of the invention.

FIG. 2 is a more simplified view of an embodiment of a laser according to the invention with parts corresponding to those of FIG. 1 bearing the same reference numeral supplemented with the prime symbol. Here, only the reservoir tank 4' and its attachment to the capillary tube 1' are different in that the frontal face rings 9' are soldered or welded directly to the metallized regions 12' and 13' of the capillary tube. The axial mobility with radial stiffness is here realized by the circumferential convex corrugation or ridge 15 in the cylinder 8'. This corrugation or ridge may also be directed inwardly.

If, after connecting the tank envelope 8, 9 or 8', 9', respectively, with the capillary tube 1 or 1', respectively, the surface of cylinder 8 or 8', respectively, is not precisely parallel with the capillary passage axis, the cylinder surface can still be worked in the sense of such parallelism for example by abrasion of parts of the surface (milling, grinding). Thus if the laser tube of FIGS. 1 and 2 is mounted by means of the surface of the cylinder 8 of the reservoir tank precisely, accurate alignment of the capillary axis is assured without the need for additional adjustment.

Figure 3:
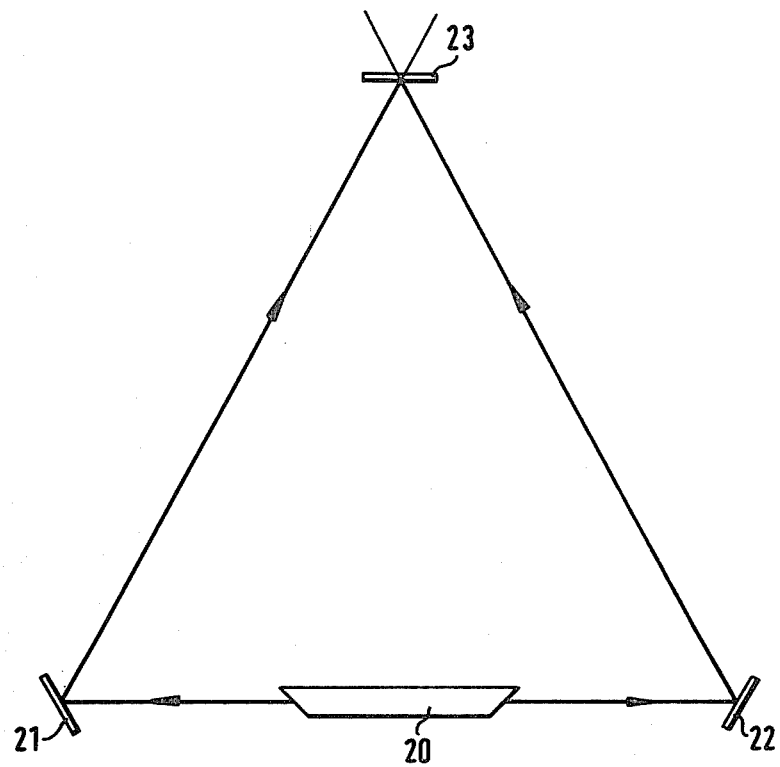
FIG. 3 is a pictorial view of a laser gyro in which a laser according to the invention may be employed.

Preferably, the laser tube according to the invention as illustrated in FIGS. 1 and 2 is utilized in a so-called active laser gyro in which two laser beams are known to travel on the same path in opposite directions. The principle of this is shown in FIG. 3 in which the laser tube 20 is associated with three mirrors 21, 22 and 23. The light beams emanating from the two end faces of the laser tube 20 are substantially reflected by the mirrors 21 and 22 and then impinge on the mirror 23 which is partially transparent. The light reflected by mirror 23 is reflected back into the laser tube 20 by the mirrors 21 and 22. This produces the feedback necessary for laser operation. The portions passing through the mirror 23 are superposed on one another by an optical arrangement (not shown) and the frequency shift between the two lightwaves produced during rotation is measured for the purpose of determining the rate of rotation. The axis of the ration of the active laser gyro is normal to the plane formed by the three mirrors.

It will be understood that the above description of the present invention is susceptible to various modifications, changes and adaptations, and the same are intended to be comprehended within the meaning and range of equivalents of the appended claims.

What is claimed is:

1. In a gas laser including a capillary tube made of electrically nonconductive material and having a capillary passage, a reservoir tank whose interior is in communication with said passage, said tank including a cylindrical portion coaxially surrounding said capillary tube and axial end portions via which said tube is connected to said tank in such a manner so as to seal the interior of said tank, an active laser gas filling said interior of said reservoir tank and said capillary passage, a cathode disposed in the interior of said tank. a counterelectrode in communication with said capillary passage, and optical means sealing the ends of said capillary passage, the improvement wherein:
said capillary tube is symmetrical with respect to a plane perpendicular to the axis of said capillary passage and midway between the ends thereof;
said counterelectrode comprises two anodes each disposed at a respective axial end of said capillary tube;
the communication between said capillary passage and the interior of said tank is provided by an opening passing through said capillary tube and located in said plane midway between the ends of said capillary passage; and
said laser further comprises means associated with said tank for providing a radially stiff, axially mobile mechanical association between at least one portion of said capillary tube at at least one portion of said tank.

2. A gas laser as defined in claim 1 wherein said anodes are integrated in the axial end faces of said capillary tube.

3. A gas laser as defined in claim 2 wherein said means sealing the ends of said capillary passage are attached to said anodes.

4. A gas laser as defined in claim 1, 2 or 3 wherein said cylindrical portion of said reservoir tank is made of metal.

5. A gas laser as defined in claim 4 wherein the outer surface of said capillary tube is metallized in the region where said tube is connected to said tank and at least one said axial portion of said tank is soldered to said metallized region.

6. A gas laser as defined in claim 1, 2 or 3 wherein the outer surface of said capillary tube is metallized in the region where said tube is connected to said tank, and further comprising a deformable metal ring soldered to said metallized region connecting said tube to one said axial portion.

7. A gas laser as defined in claim 6 wherein said deformable metal ring is connected to said one axial portion by fusing together with, or into, said portion.

* * * * *